(12) United States Patent
Berrang

(10) Patent No.: US 11,084,560 B2
(45) Date of Patent: Aug. 10, 2021

(54) MULTI-LAYER BLADDER CONSTRUCT

(71) Applicant: EPIC VENTURES INC., Sidney (CA)

(72) Inventor: Peter G Berrang, Sidney (CA)

(73) Assignee: ALUULA COMPOSITES INC., Victoria (CA)

( * ) Notice: Subject to any disclaimer, the term of this patent is extended or adjusted under 35 U.S.C. 154(b) by 80 days.

(21) Appl. No.: 16/499,933

(22) PCT Filed: May 3, 2018

(86) PCT No.: PCT/CA2018/050529
§ 371 (c)(1),
(2) Date: Oct. 1, 2019

(87) PCT Pub. No.: WO2018/213920
PCT Pub. Date: Nov. 29, 2018

(65) Prior Publication Data
US 2021/0114702 A1    Apr. 22, 2021

Related U.S. Application Data

(60) Provisional application No. 62/509,415, filed on May 22, 2017.

(51) Int. Cl.
*B63H 8/40* (2020.01)
*B32B 5/02* (2006.01)
(Continued)

(52) U.S. Cl.
CPC .............. *B63H 8/40* (2020.02); *B32B 5/024* (2013.01); *B32B 27/08* (2013.01); *B32B 27/12* (2013.01);
(Continued)

(58) Field of Classification Search
CPC .......... B63H 8/40; B32B 5/024; B32B 27/12; B32B 27/08; B32B 27/36; B32B 27/32;
(Continued)

(56) References Cited

U.S. PATENT DOCUMENTS

| 4,708,078 A | 11/1987 | Legaignoux et al. |
| 5,244,169 A | 9/1993 | Brown et al. |

(Continued)

OTHER PUBLICATIONS

International Search Report Corresponding to PCT/CA2018/050529 dated Jul. 12, 2018.
(Continued)

*Primary Examiner* — Michael C Miggins
(74) *Attorney, Agent, or Firm* — Finch & Maloney PLLC; Michael Bujold; Jay Franklin

(57) ABSTRACT

A multi-layer bladder construct consisting of a non-stretchable outer covering and a stretchable inner bladder. The outer covering has an inner surface and is made from woven polymer fibers having a warp direction and a weft direction. The inner bladder is made from a bi-axially oriented polymer film. The inner bladder has an outer surface area that is smaller than the inner surface area of the outer covering. Upon inflation, the inner bladder stretches and expands until the outer surface of the inner bladder engages the inner surface of the outer covering, whereby a portion of tensile force loading on the outer covering is shared with the inner bladder. The multi-layer bladder was developed for use in air-inflated kites used in the sport of kiteboarding, but has broader potential application.

6 Claims, 5 Drawing Sheets

(51) Int. Cl.

| | |
|---|---|
| *B32B 27/12* | (2006.01) |
| *B32B 27/08* | (2006.01) |
| *B32B 27/36* | (2006.01) |
| *B32B 27/32* | (2006.01) |
| *B32B 27/40* | (2006.01) |
| *B32B 27/28* | (2006.01) |
| *D03D 1/02* | (2006.01) |
| *D03D 15/00* | (2021.01) |

(52) U.S. Cl.
CPC .......... *B32B 27/281* (2013.01); *B32B 27/286* (2013.01); *B32B 27/32* (2013.01); *B32B 27/36* (2013.01); *B32B 27/40* (2013.01); *D03D 1/02* (2013.01); *D03D 15/00* (2013.01); *B32B 2307/518* (2013.01); *D10B 2331/04* (2013.01)

(58) Field of Classification Search
CPC ..... B32B 27/40; B32B 27/281; B32B 27/286; B32B 2307/518; D03D 1/02; D03D 15/00; D10B 2331/04
See application file for complete search history.

(56) References Cited

U.S. PATENT DOCUMENTS

| | | |
|---|---|---|
| 7,104,504 B2 | 9/2006 | Peterson et al. |
| 2009/0179112 A1 | 7/2009 | Gu |
| 2014/0070055 A1 | 3/2014 | Stiewe |

OTHER PUBLICATIONS

Written Opinion Corresponding to PCT/CA2018/050529 dated Jul. 12, 2018.

MULTI-LAYER BLADDER CONSTRUCT

FIELD

There is described a multi-layer bladder construct that was developed for an air-inflated kite used in the sport of kite boarding. It is now realized that this multi-layer bladder construct has wider application.

BACKGROUND

For the extreme sport of kite boarding, the weight and integrity of the bladder is of paramount importance for performance and safety. In kite boarding, sometimes referred to as kite surfing, a person uses a kite, generally having a "C" shape. Such kite shape, also termed "a leading edge (LE) inflatable kite", has a tube that tappers from the leading edge portion to the tips. An oversized elastomeric bladder is contained within the protective tube cover material forming the kite's leading edge tube. The kite's (pressurized) leading edge tube forms a rigid C-shape that is 10 cm-25 cm in diameter in the central portion, reducing in diameter at each tip end. The kite also has with one or more orthogonally aligned abutting struts, each containing a separate bladder, which structure supports the fabric material forming the kite's canopy.

Kites are deflated for packaging and transport. During use, the kite's leading edge tube and strut bladders are inflated to about 13-36 Newtons (3-8 lbs.) above ambient atmospheric pressure. The leading edge bladder and struts can be inflated simultaneously, or separately. Without inflation, or low inflation, a kite becomes floppy in the water, or in the air, with some wind drag, but cannot create a proper aerodynamic shape.

U.S. Pat. No. 4,708,078 by Legaignoux, et. al. teaches the first use of a kite design that can be re-launched from the water surface, which key innovation spurred the sport of kite boarding. Subsequent innovations seek to improve on re-launching the kite from the water surface, such as, for example, U.S. Pat. No. 7,104,504 B2 by Peterson et al. which describes a system whereby the kite rider can use a dedicated line (or piggybacking onto one of the existing lines) to adjust the kite canopy profile to exhibit different aerodynamic characteristics to facilitate re-launching the kite. However, a key aspect of all kites is weight, as the overall kite weight will determine the ease of re-launch, responsiveness of the kite during riding, and the ability of the kite to fly in light winds.

SUMMARY

There is provided a multi-layer bladder construct consisting of a non-stretchable outer covering and a stretchable inner bladder. The outer covering has an inner surface and is made from woven polymer fibers having a warp direction and a weft direction. The inner bladder is made from a bi-axially oriented polymer film. The inner bladder has an outer surface area that is smaller than the inner surface area of the outer covering. Upon inflation, the inner bladder stretches and expands until the outer surface of the inner bladder engages the inner surface of the outer covering, whereby a portion of the tensile force loading on the outer covering is shared with the inner bladder.

In developing the above described multi-layer bladder construct, a problem had to be addressed as to how to make the bladder construct lighter in weight, without sacrificing integrity when the bladder construct was placed under load. The use of an inner bladder with an outer surface area that is smaller than the inner surface area of the outer covering, makes the multi-layer bladder construct lighter. A smaller bladder can be used, as expansion of the inner bladder is limited by the inner surface of the outer covering. This also serves to share a portion of the tensile force load from the outer covering to the inner bladder, so that the multi-layer bladder construct is able to handle greater tensile force load than the outer covering alone can bear. The expanded bladder essentially acts as a tensile-bearing component, allowing for the use of a lighter outer covering, and thus a lighter kite.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A multi-layer bladder construct will now be described with reference to FIG. 1 through FIG. 5. The description will use as an example the multi-layer bladder construct in use with respect to an air-inflatable kite used in the sport of kite boarding.

Figure 1:
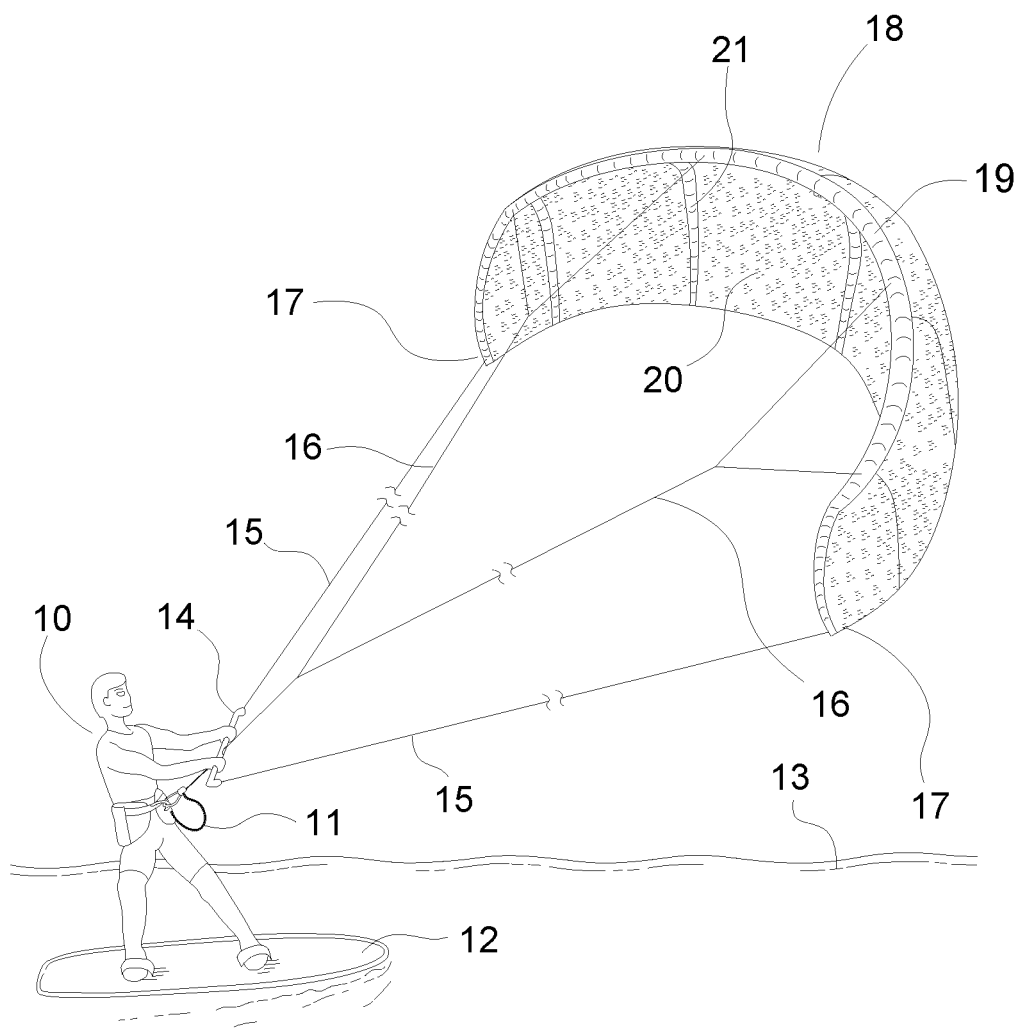
FIG. 1 is a perspective view of an air-inflated kite used in the sport of kiteboarding.

Structure and Relationship of Parts:

FIG. 1 illustrates a kilter 10 engaged in the sport of kite boarding or kite surfing. The kiter stands on a kite board 12 on the water surface 13 holding a control bar 14. Outside (steering) lines 15 are connected near the wingtips 17, and inside lines 16 are also attached to the kite 18 at the distil end. The leading edge tube 19 is inflated, thereby creating a curved rigid structure, with struts 21 supporting the canopy 20 to create aerodynamic lift. Outside lines 15 are connected to control bar 14 to provide for steering the kite. Inside lines 16 are connected at the proximal end to a hook mechanism on the kiter's harness. A safety leash line 11 connects the kiter to one or two of the inside lines to remain tethered to the kite in the event the kiter lets of the control bar and also detaches from the hook connecting the inside lines. The kite 18 is not attached to the board 12. The kiter 10 manoeuvers kite 18 so as to pull the kiter and the board 12 across the surface of the water 13.

Figure 2:
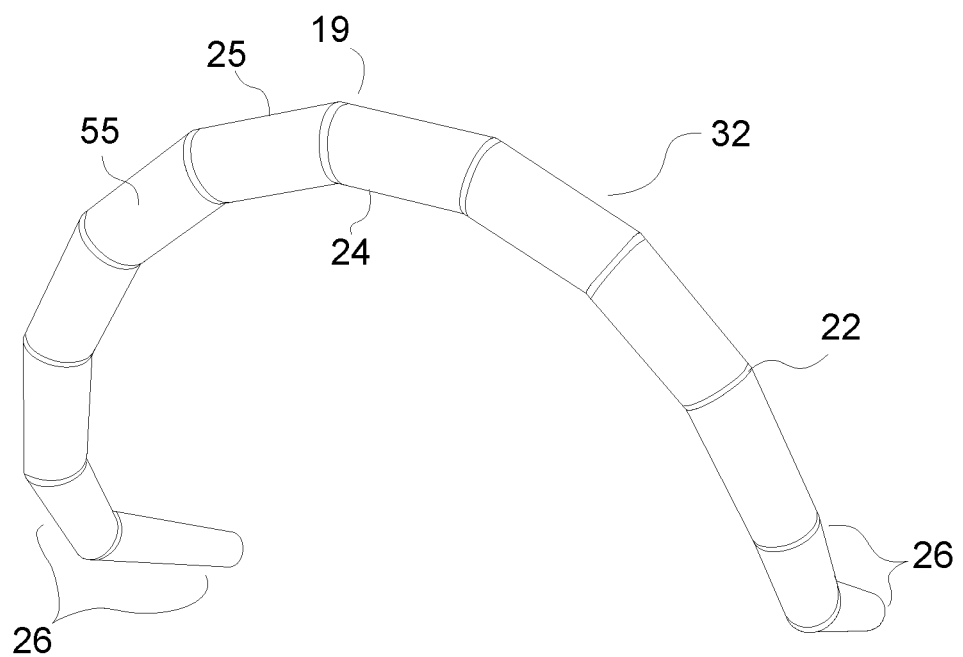
FIG. 2 is a perspective view of an air-inflated leading edge tube of the air-inflated kite illustrated in FIG. 1.

FIG. 2 shows an expanded view of an inflated leading edge tube 19 (without struts or canopy). For clarity, the tip sections, which sections are generally tapered, are shown as 26. The rest of the leading edge tube 19, which tube has a larger diameter, is defined as the "main tube section". To create a curved shape, a non-stretchable outer covering 32 is formed into panels 55 are sewn together at various locations 22, where the length of the inner curved surface 24 is shorter than the outer curved surface 25, thereby causing the leading edge tube 19 to form a curved shape when inflated.

Figure 3:
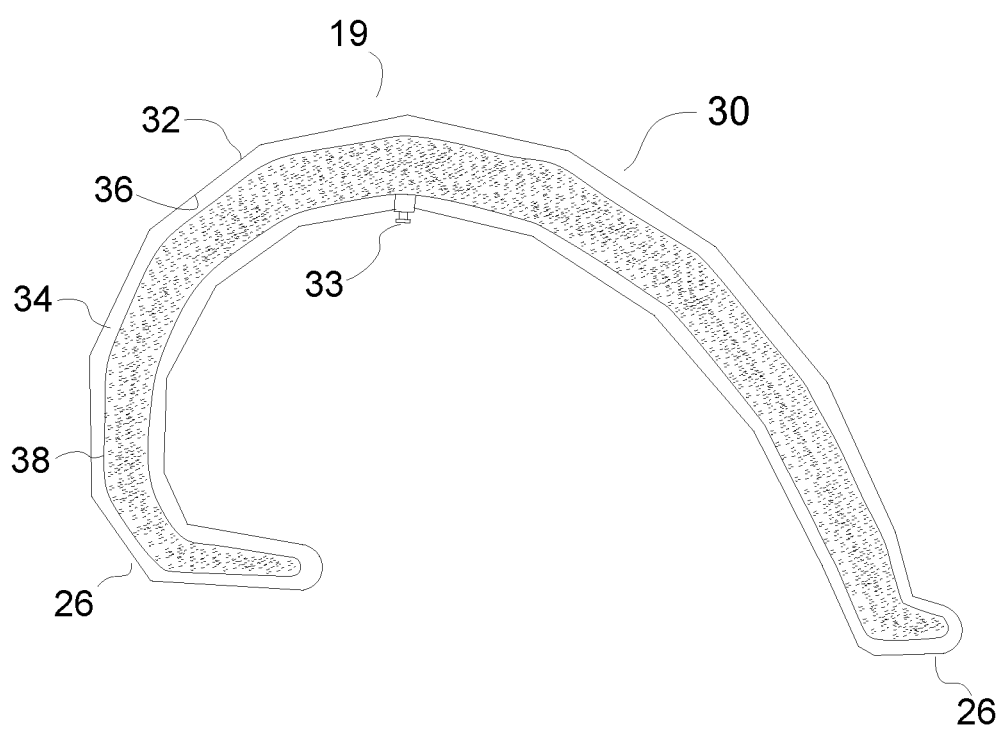
FIG. 3 is a longitudinal section view of the air-inflated leading edge tube illustrated in FIG. 2, prior to inflation.

Referring to FIG. 3, leading edge tube 19 is made from a multi-layer bladder construct 30 consisting of the non-stretchable outer covering 32 and a stretchable inner bladder 34. Outer covering 32 has an inner surface 36. Inner bladder 34 has an outer surface area 38 that is smaller than inner surface 36 of outer covering 32. A valve 33 is provided for the purpose of inflating and deflating inner bladder 34.

Figure 4:
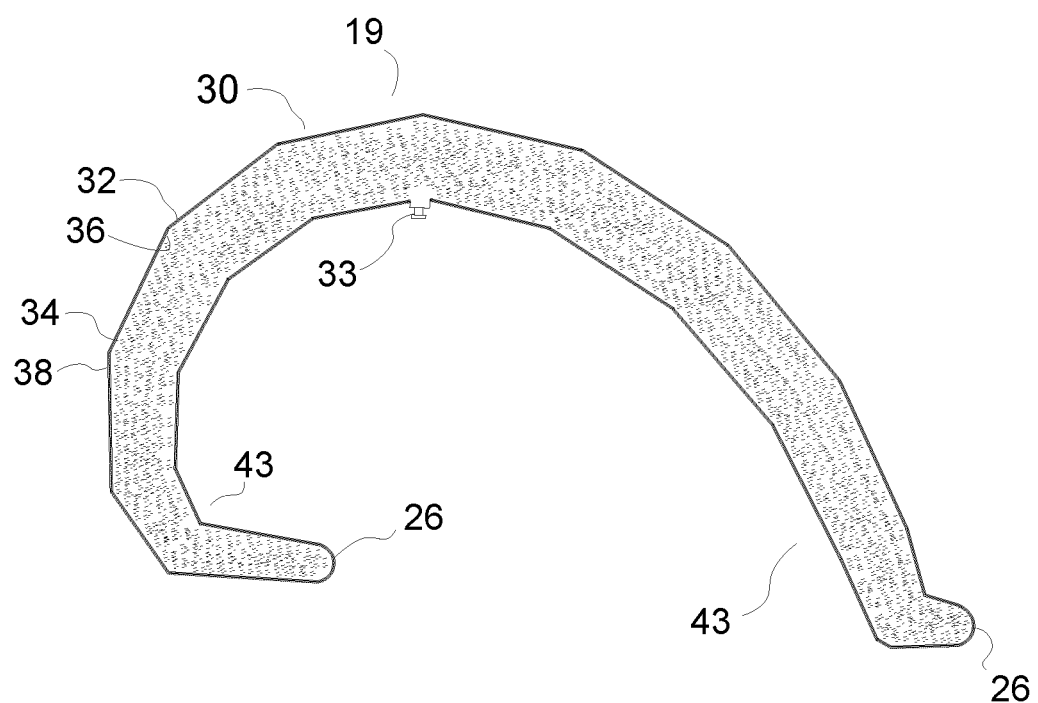
FIG. 4 is a longitudinal section view of the air-inflated leading edge tube illustrated in FIG. 2, after inflation.

Referring to FIG. 4 bladder 34 is shown as inflated, with the outer surface contacting the non-stretchable outer covering 32. Outer covering 32 is made from a woven polymer fabric which fibres are oriented in a warp direction 61 and a weft directions 60 (see FIG. 5). A suitable material for the outer covering 32 is a woven Dacron fabric that is coated with a sealant polymer, and as such, does not significantly stretch in the warp, weft or bias directions.

Figure 5:
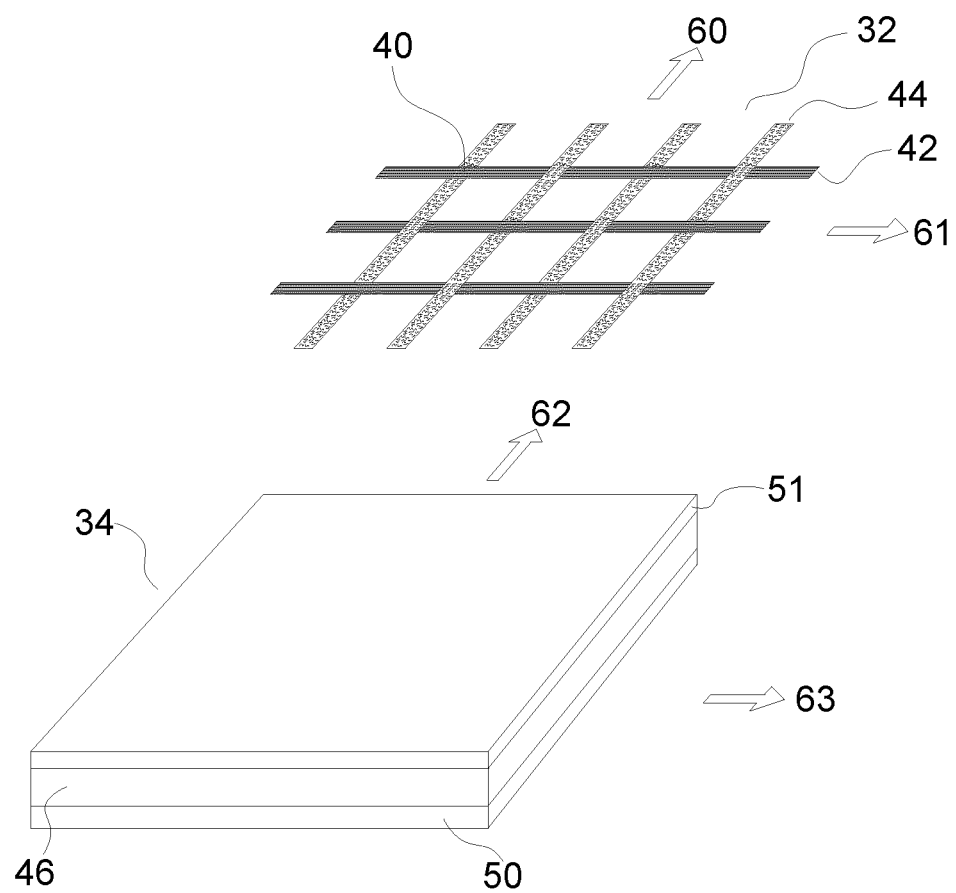
FIG. 5 is an exploded perspective view of an enlarged portion of the outer covering and inner bladder forming the bladder construct used in the air-inflated leading edge tube.

Referring to FIG. 5, inner bladder 34 is made from a bi-axially oriented polymer film 46 having molecular orientation in both a first direction 63 referred to as "Machine Direction (MD)", and a second direction 62, referred to as "Transverse Direction (TD)". Although any biaxially-oriented polymer film, such as, for example, BOPP, BOPE, BOPET, BOPA, PEN or PPS could be used for fabricating the bladder construct, it is preferred to use a biaxially-oriented BOPET film that will result in a bladder construct weighting about 10-70 gsm (grams per square meter), preferably about 20-45 gsm where both sides of such a BOPET film are fused to a (thermoplastic) heat-sealable or fusible layer, shown as 50 and 51, comprised of, for example, a polyethylene, or a polyolefin, a polyurethane, or a co-polymer thereof, or a co-polymer polyamide, with a melting temperature that is 10 C or more below the melting point of the BOPET film. Such biaxially-oriented films are much stronger and resilient in the MD 63 and TD 62 directions than prior art TPU bladder films, allowing for the use of much lighter bladders. FIG. 5 also illustrates the woven polymer fabric 40 forming outer covering 32, with warp fibers 42 shown in the warp direction 61 and weft fibers 44 in weft direction 60.

Referring to FIG. 5, it is preferred one of the MD 63 or TD 62 direction of the bi-axially oriented polymer film 46 forming inner bladder 34 is aligned with one of fibres 42 in the warp direction 61 or fibres 44 the weft direction 60 of woven polymer fabric 40 forming outer covering 32. This co-alignment of outer covering fibers and oriented polymer bladder serves to increase both the radial and longitudinal tensile strength of the multi-layer bladder construct, as will hereinafter be further explained.

Operation:

Referring to FIG. 3, there is illustrated inner bladder 34 undersized by approximately 1%-5% when the surface area of the bladder is compared to the surface area of the non-stretchable outer covering, When inflated, inner bladder 34 expands within or near its elastic limit with inner bladder 34 thickness thinning during inflation until outer surface 38 of inner bladder 32 engages inner surface 36 of outer covering 32. When this occurs a portion of the tensile force loading on outer covering 32 is shared with inner bladder 34. It is preferred that inner bladder 34, when inflated, shares at least 5% of the tensile force loading on outer covering 32.

The structure of multi-layer bladder construct 30, shown in FIG. 4, greatly reduces the probability of herniation, or material aneurysm, tear or rupture, and when installed undersized, provides part of the tensile force loading of the inflated Dacron fabric leading edge.

By co-aligning, for example, the Dacron fabric warp with the oriented film MD (Machine Direction), and the fabric weft with the film TD (Transverse Direction) such oriented layering adds the tensile strength of both materials add to provide an exceptionally high combined tensile strength construct.

Since the tensile loading of the inflated leading edge is predominately in the radial direction, it is advantageous to orient the layers such that maximum combined tensile strength is in the radial direction.

Such combined tensile strength of the Dacron fabric and the orientated film also provides for the use of a lighter Dacron weave weight in the radial direction, as the loading of the Dacron weave is partially shared with the oriented film, thus allowing for the design of a lighter kite.

Cautionary Warnings:

It has been found that heat sealing a mono-layer of biaxially-oriented polymer film to itself for use as an air-tight bladder is either not possible, depending on the polymer, or, for thermoplastic materials, causes buckling of the film at the seal area, which leads to an imperfect seal and air leakage. Better results have been obtained by applying a heat fusible adhesive layer to one or both sides of the biaxially-oriented polymer film. Such heat fusible films need to have a melting point about 10 C or more below the melting point of the biaxially-oriented polymer.

The prior art uses a highly stretchable TPU film. Under-sizing such a elastomeric film is problematic, as this would thin out the film, and be prone to create areas of herniation, pinhole leaks and greatly increase the probability of rupturing the delicate TPU film.

Referring to FIG. 2, it should be noted that leading edge tube 19 has tip sections 26 that are generally tapered. This is a vulnerable area. It is recommended that inner bladder not be undersized at tip section 26 and instead be tapered to conform to tip sections 26 without any, or with minimal, stretch. It is also preferred that the thickness of the inner bladder in the tip area be at least 25% thicker than the inner bladder in the leading edge area.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A multi-layer bladder construct, comprising:
   a non-stretchable outer covering having an inner surface, the outer covering is comprised of a woven polymer fabric having a warp direction and a weft direction;
   a stretchable inner bladder having an outer surface, the inner bladder being comprised of a bi-axially oriented polymer film having opposed sides, the polymer film having a film machine direction and a film transverse direction orthogonal to the film machine direction, the polymer film having an elastic expansion range within which the inner bladder expands outwardly and then returns to its uninflated size after inflation;
   a sealing layer bonded to at least one of the opposed sides of the polymer film forming the inner bladder, thereby making the inner bladder heat sealable to itself to make the inner bladder air-tight;
   wherein one of the film machine direction or the film transverse direction of the polymer film forming the inner bladder is aligned with one of the warp direction or the weft direction of the woven polymer fabric forming the outer covering;

a surface area of the outer surface of the inner bladder is smaller than a surface area of the inner surface of the outer covering, such that, upon inflation, the inner bladder stretches and expands outwardly within the elastic expansion range until the outer surface of the inner bladder engages the inner surface of the outer covering, whereby a portion of tensile force loading on the outer covering is shared with the inner bladder.

2. The multi-layer bladder construct of claim 1, wherein the outer covering forms a leading edge tube of an air-inflated kite used in the sport of kite boarding.

3. The multi-layer bladder construct of claim 1, wherein the polymer film comprises one of BOPET, BOPP, BOPE, BOPA, PEN or PPS.

4. The multi-layer bladder construct of claim 1, wherein the sealing layer comprises one of a polyethylene, a polyolefin, a polyurethane, a polyimide or a co-polymer thereof.

5. The multi-layer bladder construct of claim 1, wherein the surface area of the outer surface of the inner bladder is smaller by 1%-5% than the surface area of the inner surface of the outer covering.

6. A method of fabricating a multi-layer bladder construct, comprising:

fabricating a non-stretchable outer covering having an inner surface, and the outer covering comprises a woven polymer fabric having a warp direction and a weft direction fabricating a stretchable inner bladder having an outer surface, a surface area of the outer surface of the inner bladder being smaller than a surface area of the inner surface of the outer covering, the inner bladder being comprised of a bi-axially oriented polymer film having opposed sides, the polymer film having a film machine direction and a film transverse direction orthogonal to the film machine direction, the polymer film having an elastic expansion range within which the inner bladder expands outwardly and then returns to its uninflated size after inflation;

fusing a sealing layer onto at least one of the opposed sides of polymer film forming the inner bladder, thereby making the inner bladder heat sealable to itself to make the inner bladder air-tight, and the sealing layer having a melting temperature at least 10 degrees Celsius lower than the polymer film; and inserting the inner bladder into the outer covering and aligning one of the film machine direction or the film transverse direction of the polymer film forming the inner bladder with one of the warp direction or the weft direction of the woven polymer fabric forming the outer covering, and the elastic expansion range of the inner bladder is not exceeded when the outer surface of the inner bladder contacts the inner surface of the outer covering.

* * * * *